R. McCormick,
Cherry Stoner,
No. 28,881.    Patented June 26 1860.

Witnesses.    Inventor.
Robert McCormick.

UNITED STATES PATENT OFFICE.

ROBERT McCORMICK, OF GREENVILLE, VIRGINIA.

MACHINE FOR STONING FRUIT.

Specification of Letters Patent No. 28,881, dated June 26, 1860.

*To all whom it may concern:*

Be it known that I, ROBERT McCORMICK, of Greenville, Augusta county, Virginia, have invented a new and useful Machine for Stoning Fruit; and I do declare that the following is a full, clear, and exact description of the construction and operation of the same, reference being had to the accompanying drawings, making a part of this specification, in which—

Figure 1:
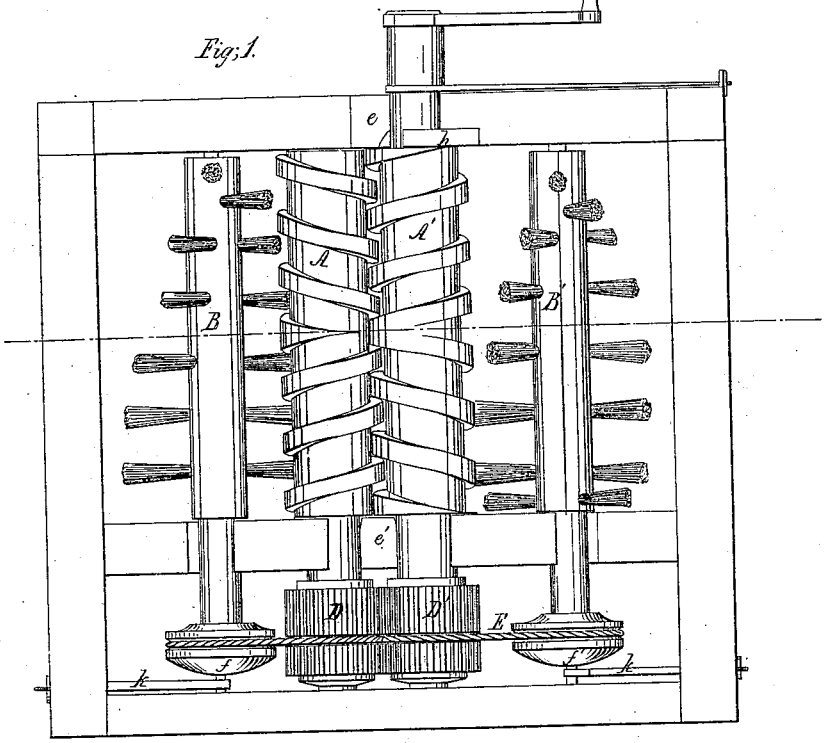
Figure 2:
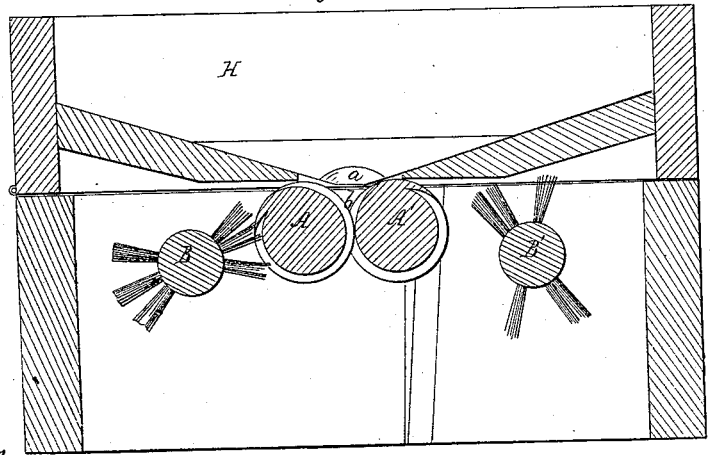

Figure 1 is a top view or plan of the working parts with the hopper removed. Fig. 2 is a vertical section through the machine with the hopper in its proper position.

A and A′ are revolving screws which take hold of the pulp of the stone fruits and draw it between them, while the stones are detained and conducted by the screws to the openings in the frames marked e, e, where they are discharged from the machine; this is accomplished by running the screw threads outward from about the middle of the screws.

B and B′ are revolving brushes for cleaning the pulp from the screws.

D and D′ are cog wheels of equal diameter, and of the same diameter (or nearly so) of the screws.

E and E′ are bands which drive the brushes.

$i$, is a screw-check which acts in connection with the follower $h$, and regulates the distance between the screws.

K, K, are band tighteners for the revolving brushes.

In Fig. 2 A and A′ are end views of the revolving screws; B and B′ are end views of the brushes; $a$ is an overlying platform gage which receives and detains the fruit until stoned allowing the stones to pass under it, out of the machine; $b$ is a passage under the platform, through which the stones pass; H is the hopper for feeding the fruit to the machine; $i, i$, forms the bottom of the hopper and conducts the fruit to the revolving screws, being placed so near the screws, as to permit them only to revolve without touching.

What I claim as my invention and desire to secure by Letters Patent, is—

The combination and arrangement of the right and left screws A A′ the brushes B B′ the cog wheels D D′ the bands E E′ the pulleys $f$ $f'$ the hopper H the follower $h$ the screw-check $i$ the gage $a$ the band-tighteners K K all substantially as and for the purpose specified.

ROBERT McCORMICK.

Witnesses:
I. A. KAYSER,
ALEXANDER HALL.